(12) United States Patent
Nakamura et al.

(10) Patent No.: US 9,415,341 B2
(45) Date of Patent: Aug. 16, 2016

(54) AIR PURIFIER

(71) Applicant: Sharp Kabushiki Kaisha, Osaka-shi, Osaka (JP)

(72) Inventors: Yoshinori Nakamura, Osaka (JP); Shinichi Sakaguchi, Osaka (JP); Tomoki Takahashi, Osaka (JP); Masafumi Nishino, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/909,779

(22) PCT Filed: Feb. 25, 2014

(86) PCT No.: PCT/JP2014/054531
§ 371 (c)(1),
(2) Date: Feb. 3, 2016

(87) PCT Pub. No.: WO2015/025539
PCT Pub. Date: Feb. 26, 2015

(65) Prior Publication Data
US 2016/0175755 A1    Jun. 23, 2016

(30) Foreign Application Priority Data
Aug. 23, 2013  (JP) ................................. 2013-173211

(51) Int. Cl.
*B01D 46/00*    (2006.01)
*B01D 46/42*    (2006.01)

(52) U.S. Cl.
CPC .......... *B01D 46/429* (2013.01); *B01D 46/0045* (2013.01)

(58) Field of Classification Search
CPC .................................................... B01D 46/429
See application file for complete search history.

(56) References Cited

U.S. PATENT DOCUMENTS

| 2007/0009363 A1* | 1/2007 | King ..................... F04D 29/703 416/210 R |
| 2007/0079619 A1* | 4/2007 | Hamada ................ F24F 1/0007 62/180 |
| 2013/0081541 A1* | 4/2013 | Hasenoehrl ............ A61L 9/035 96/222 |

FOREIGN PATENT DOCUMENTS

| JP | 09-122421 A   | 5/1997 |
| JP | 2007-208981 A | 8/2007 |
| JP | 2013-057507 A | 3/2013 |
| JP | 2013-070793 A | 4/2013 |
| JP | 2013-072584 A | 4/2013 |
| JP | 2013-078719 A | 5/2013 |

* cited by examiner

*Primary Examiner* — Duane Smith
*Assistant Examiner* — Adam W Bergfelder
(74) *Attorney, Agent, or Firm* — Keating & Bennett, LLP

(57) ABSTRACT

A wind direction plate of an air purifier includes a core member provided between an upper wall and a lower wall and extending in a substantially horizontal direction, and an infrared light highly scattering member provided on a side of the core member facing an infrared unit, the infrared light highly scattering member having a higher degree of scattered reflection of infrared light received by the infrared unit and/or infrared light transmitted from the infrared unit than a degree of scattered reflection on the core member.

5 Claims, 11 Drawing Sheets

AIR PURIFIER

TECHNICAL FIELD

The present invention relates to an air purifier for purifying air taken therein and discharging the air.

BACKGROUND ART

Air in a room includes a variety of substances which may be undesirable or harmful to the human body, such as dust, pollen, cigarette smoke, and exhaled breath. Particularly in recent years, the harmful substances tend to accumulate in a room due to increased air tightness of a house. Thus, in areas with serious air pollution, or at homes, offices and the like with people suffering from pollen allergy, it is difficult to naturally ventilate a room by opening windows, which has resulted in widespread use of air purifiers having the function of cleaning air by a filter that purifies the air in a room.

Air purifiers having a humidifying function have also been commercialized for adjusting the humidity of air to be more comfortable while purifying the air. In such an air purifier, the air purified by passing through a filter unit is further humidified by passing through a humidification filter.

Such an air purifier including a humidification filter is disclosed in Japanese Patent Laying-Open No. 2013-78719 (PTD 1), Japanese Patent Laying-Open No. 2013-72584 (PTD 2), Japanese Patent Laying-Open No. 2013-70793 (PTD 3), and Japanese Patent Laying-Open No. 2013-57507 (PTD 4). Japanese Patent Laying-Open No. 2007-208981 (PTD 5) discloses a technique of an infrared light emitting device for use in electrical equipment. Japanese Patent Laying-Open No. 09-122421 (PTD 6) discloses a technique of an air filter and its applied equipment.

CITATION LIST

Patent Documents

PTD 1: Japanese Patent Laying-Open No. 2013-78719
PTD 2: Japanese Patent Laying-Open No. 2013-72584
PTD 3: Japanese Patent Laying-Open No. 2013-70793
PTD 4: Japanese Patent Laying-Open No. 2013-57507
PTD 5: Japanese Patent Laying-Open No. 2007-208981
PTD 6: Japanese Patent Laying-Open No. 09-122421

SUMMARY OF INVENTION

Technical Problem

In recent years, enhanced functionality of an air purifier has been demanded. Accordingly, the present invention has been made in view of such a problem, and an object of the present invention is to provide an air purifier with enhanced functionality.

Solution to Problem

In one aspect of an air purifier based on this invention, an air purifier having an air outlet defined by a region surrounded by an upper wall and a lower wall at a front side of a housing includes a wind direction plate provided between the upper wall and the lower wall and extending in a substantially horizontal direction, and an infrared unit provided below the upper wall and including an infrared element capable of receiving and/or transmitting infrared light, the wind direction plate including a core member provided between the upper wall and the lower wall and extending in a substantially horizontal direction, and an infrared light highly scattering member provided on a side of the core member facing the infrared unit, the infrared light highly scattering member having a higher degree of scattered reflection of infrared light received by the infrared unit and/or infrared light transmitted from the infrared unit than a degree of scattered reflection on the core member.

In another embodiment, a side surface of the core member facing the infrared unit has an inclined surface extending downward from a back side toward a front side.

In another embodiment, the infrared light highly scattering member is a film obtained by performing a plating process on the core member.

In another embodiment, when the air purifier is seen in plan view, the air outlet is provided to extend toward the back from a central region toward opposite sides, and the infrared unit is provided in the central region of the air outlet.

In another embodiment, the infrared element is disposed such that a light receiving portion thereof faces forward.

In another aspect of the air purifier based on this invention, an air purifier includes a dust-proof filter detachably inserted in a housing through an air outlet provided at a front side of the housing, the dust-proof filter including a base portion and a filter portion provided to stand from the base portion, the filter portion including a filter member and an elastically deformable frame member for surrounding and retaining the filter member, the frame member having a vertical frame member standing from the base portion and a horizontal frame member extending in a direction intersecting with the vertical frame member, a brittle region formed as a thinner region than the other regions being provided in the vertical frame member.

In another embodiment, the frame member further has a horizontal auxiliary frame member extending parallel to the horizontal frame member so as to divide the filter member, and the brittle region is provided in a region of the vertical frame member close to the base portion side in the vicinity of the intersecting horizontal auxiliary frame member.

In still another aspect of the air purifier based on this invention, an air purifier having an air outlet at a front side of a housing includes an audio opening provided at a back side of the housing, and a speaker assembly provided in the housing in the vicinity of the audio opening and including a speaker for emitting voice.

In another embodiment, the housing has a bottom panel for covering a bottom surface of the housing, the bottom panel has a bottom plate located at the bottom surface of the housing, and a back wall standing from the bottom plate at the back side of the housing, and the audio opening is provided in the back wall.

In another embodiment, the speaker has a disk-shaped oscillation portion, the speaker assembly is fixed to the bottom panel such that the oscillation portion faces the bottom plate at a prescribed distance from the bottom plate, and the bottom plate facing the speaker has an inclined bottom having a distance from the speaker which increases toward the back wall provided with the audio opening.

In another embodiment, the speaker assembly has a first retaining member having a cylindrical shape with a bottom, retaining the speaker at the bottom, and having a hole in the bottom for opening the oscillation portion, and a second retaining member having a cylindrical shape with a bottom, accommodating the first retaining member from its open side, and having a support strut extending from the bottom toward the open side and supporting the speaker from a rear face side of the speaker.

Advantageous Effects of Invention

According to the present invention, an air purifier with enhanced functionality can be provided.

DESCRIPTION OF EMBODIMENTS

Figure 1:
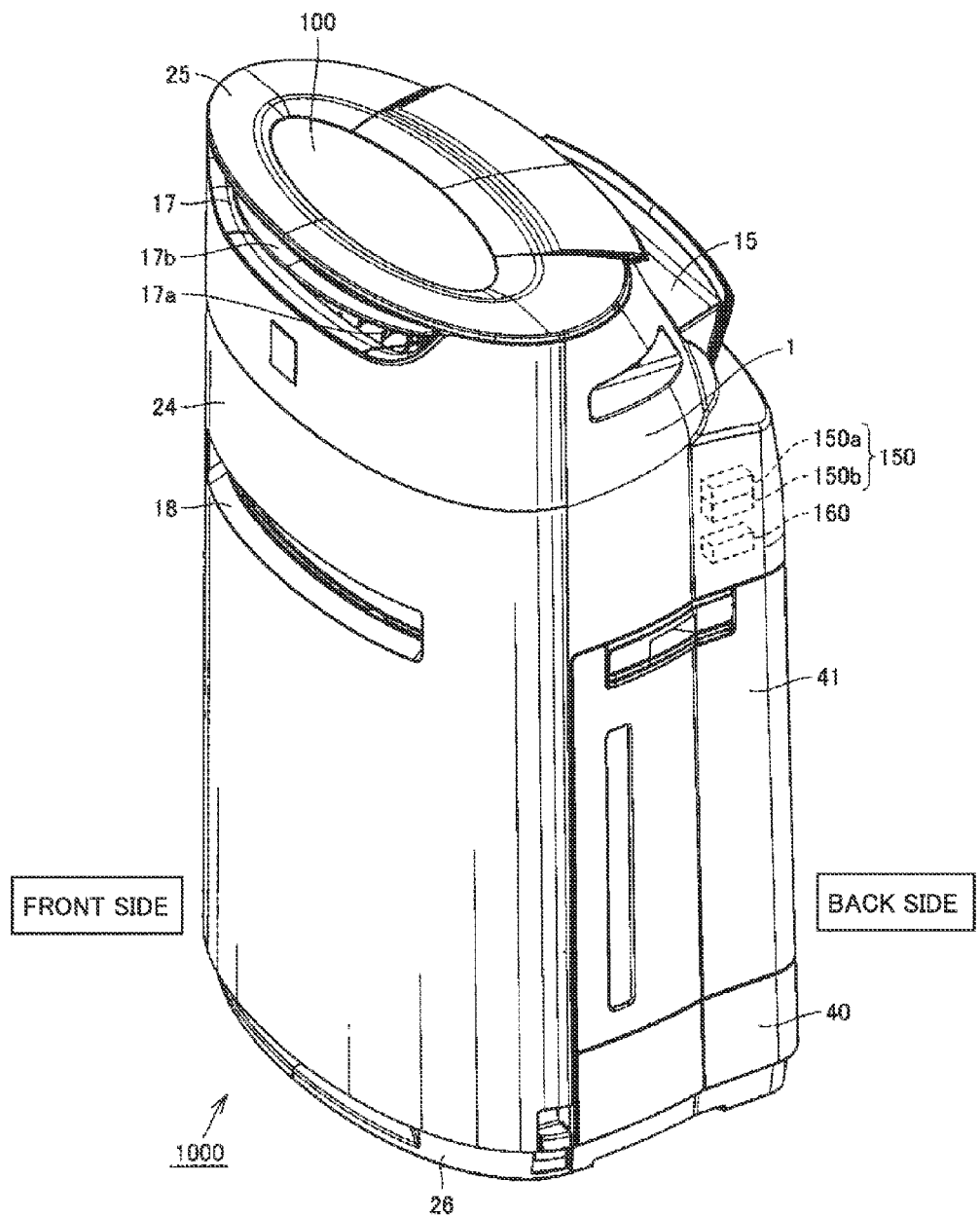
FIG. 1 is an overall perspective view of an air purifier in a first embodiment.

An air purifier in each embodiment will be described with reference to the drawings. In the drawings of each embodiment, the same reference signs refer to the same or corresponding parts and a redundant description may not be repeated. When a number, an amount or the like is mentioned in each embodiment, the scope of the present invention is not necessarily limited to the number, the amount or the like unless otherwise specified. It is originally intended to combine and use configurations in each embodiment as appropriate.

(First Embodiment: Air Purifier 1000)

Figure 2:
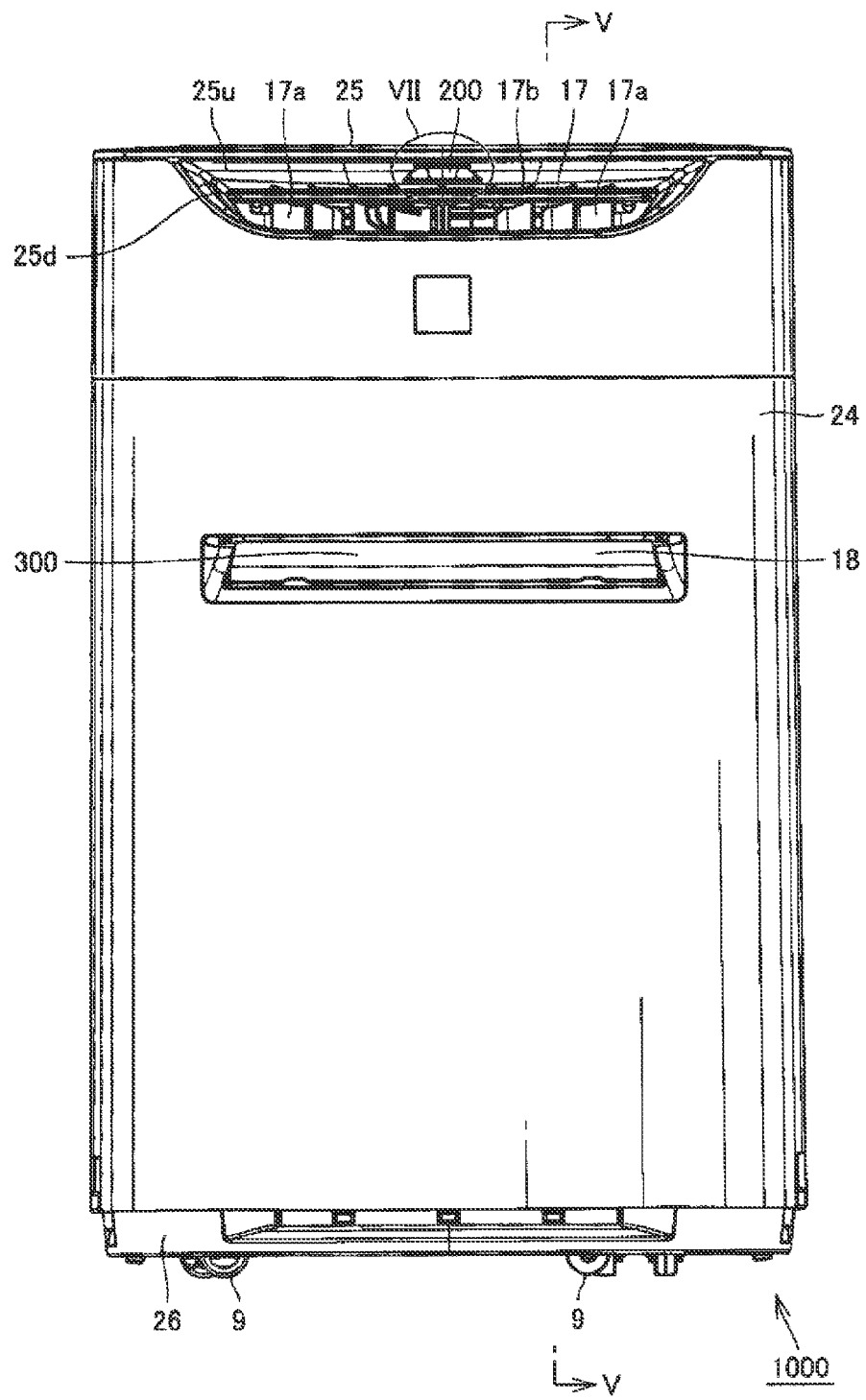
FIG. 2 is a front view of the air purifier in the first embodiment.
Figure 3:
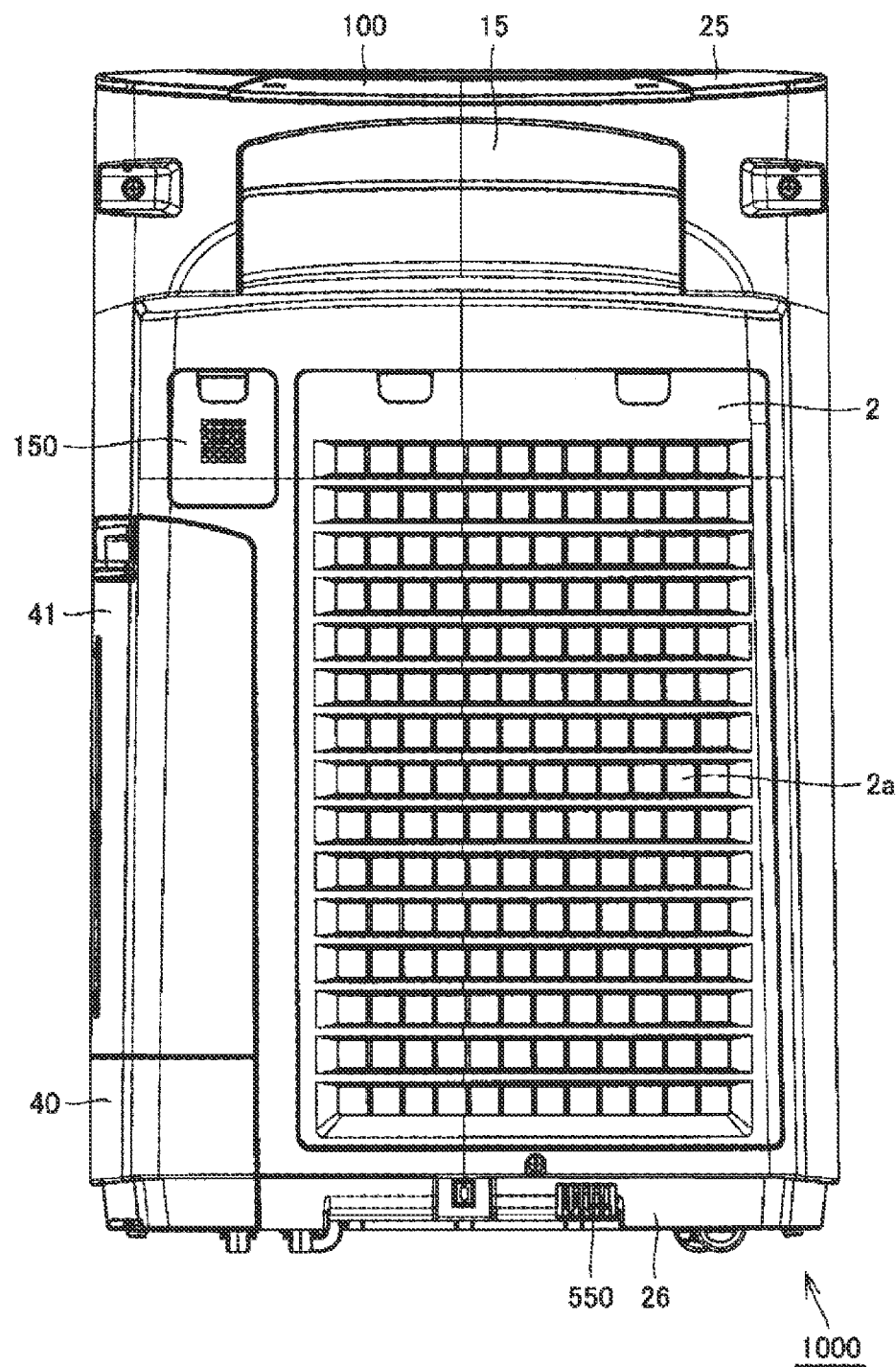
FIG. 3 is a rear view of the air purifier in the first embodiment.
Figure 4:
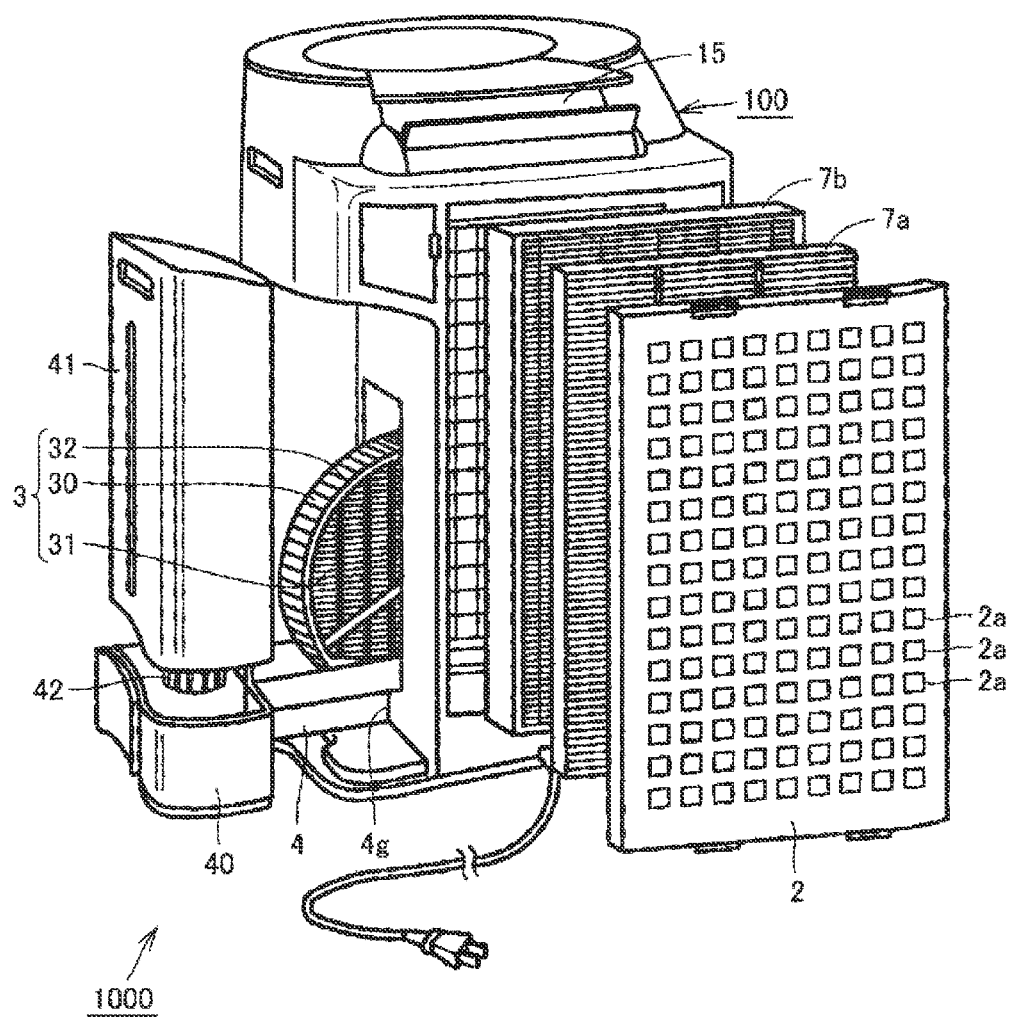
FIG. 4 is a configuration diagram of components when viewed from a rear face side of the air purifier in the first embodiment.
Figure 5:
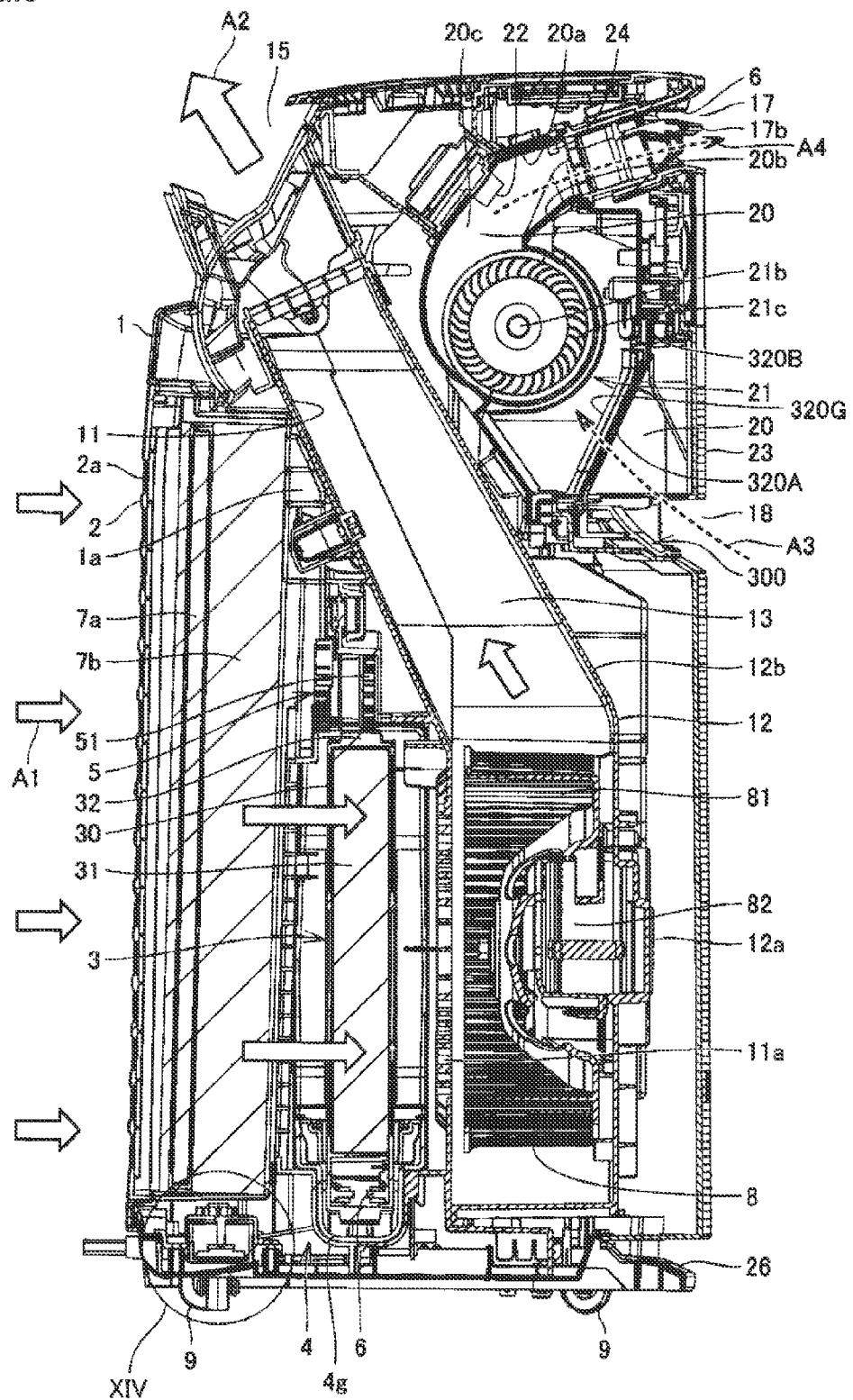
FIG. 5 is a sectional view taken along line V-V in a direction or arrows in FIG. 2.
Figure 6:
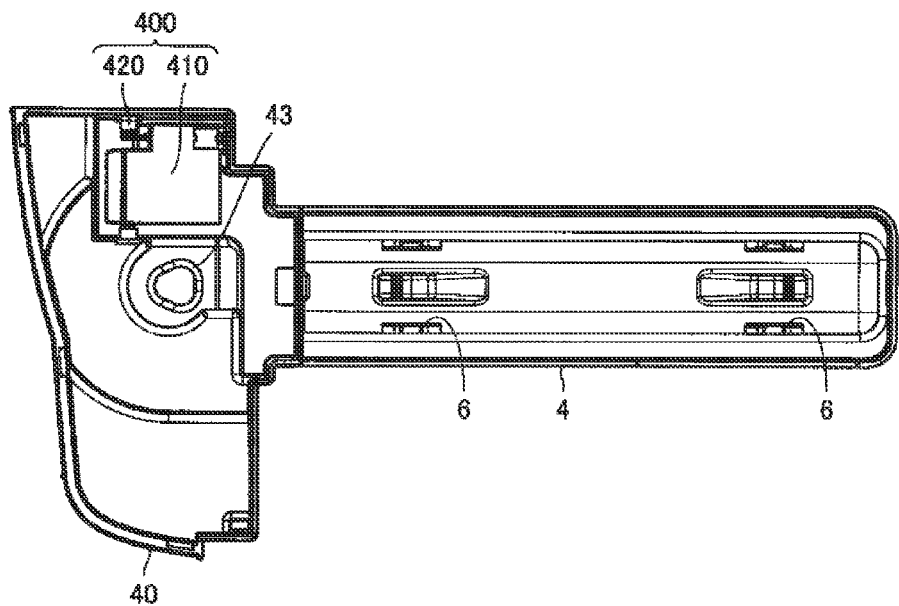
FIG. 6 is a plan view of a water tank and a tank receiver used in the air purifier in the first embodiment.

Referring to FIGS. 1 to 6, a configuration of an air purifier 1000 in this embodiment is described. FIG. 1 is an overall perspective view of air purifier 1000 in this embodiment, FIG. 2 is a front view of air purifier 1000 in this embodiment, FIG. 3 is a rear view of air purifier 1000 in this embodiment, FIG. 4 is a configuration diagram of components when viewed from a rear face side of air purifier 1000 in this embodiment, FIG. 5 is a sectional view taken along line V-V in a direction or arrows in FIG. 2, and FIG. 6 is a plan view of a water tank 4 and a tank receiver 40 used in air purifier 1000 in this embodiment.

Referring to FIGS. 1 and 2, air purifier 1000 in this embodiment has a housing 1, with an air outlet 17 and an air inlet 18 provided at a front face side, and with tank receiver 40 and a feed water tank 41 provided at a side face side. An operation panel 100 is provided on a top panel 25 at an upper surface of housing 1 of air purifier 1000.

Air outlet 17 has a horizontally long, substantially oval or elliptical shape in front view. In plan view, air outlet 17 has a substantially elliptical shape where opposite right and left sides extend toward the back from a central region toward the opposite sides. A plurality of vertically positioned wind direction plates 17a juxtaposed to each other horizontally with spacing between them, and a horizontally positioned (positioned to extend in a substantially horizontal direction) wind direction plate 17b are provided in air outlet 17. The plate faces of vertically positioned wind direction plates 17a open at a laterally outward direction toward the outflow side, with the angle of the plates increasing as the plates are placed closer to opposite end portions in a horizontal direction. As a result, a flow of air blown forward from air outlet 17 can be expanded in the horizontal direction.

Horizontally positioned wind direction plate 17b is used to put the flow of air blown forward in a substantially horizontal state. Vertically positioned wind direction plates 17a and horizontally positioned wind direction plate 17b are formed of an integrally molded member. In air outlet 17, an infrared unit 200 is provided at a lower surface of an upper wall 171 of a central region. The details of infrared unit 200 will be described later.

Air inlet 18 has a substantially rectangular shape in front view. A dust-proof filter 300 is detachably mounted in a vertical position in air inlet 18. A structure of dust-proof filter 300 will be described later.

A plurality of wheels 9 with a locking mechanism are attached to a bottom surface of housing 1. Thereby, air purifier 1000 can be moved to an appropriate position in a room by disengaging the locking mechanism of wheels 9, and then the air purifier can be immovably disposed on a floor by activating the locking mechanism.

Referring to FIG. 3, air inlets 2a, an air outlet 15, a pollution detection unit 150, and an audio opening 550 are provided in a back panel 2 at a back face side of air purifier 1000. Audio opening 550 and a speaker assembly 500 will be described later.

Referring to FIGS. 4 and 5, the interior of housing 1 is partitioned into front and back sections by a dividing wall 11. A substantially upper half of dividing wall 11 is inclined rearward. A filter storage portion 1a for storing various filters for purification is formed behind dividing wall 11. Filter storage portion 1a is a hollow space in the shape of a parallelepiped which opens at the back face side of housing 1. A deodorization filter 7a and a dust collection filter 7b sequentially stacked from the back side are stored in filter storage portion 1a.

Deodorization filter 7a has the function of adsorbing an odor component in the air such as acetaldehyde, ammonia, and acetic acid. Deodorization filter 7a has a structure in which nonwoven fabric made of polyester is attached to a rectangular frame body, activated carbon is uniformly disposed thereon in a dispersed manner, and nonwoven fabric made of polyester is overlaid thereon.

Dust collection filter 7b has the function of trapping fine dust, and is formed of a so-called HEPA (High Efficiency Particulate Air) filter. The HEPA filter has a structure in which meltblown nonwoven fabric to which an electromagnet process has been performed is mixed in an aggregate made of polyester and vinylon nonwoven fabric to form a filtering material, the filtering material is folded, antibacterial sheets made of nonwoven fabric to which a hydroxyapatite process has been performed are thermally bonded to upper and lower surfaces of the folded filtering material, and a frame made of nonwoven fabric to which a hot melt process has been performed is melt-bonded thereto.

There is provided detachable back panel 2 for covering the opening in filter storage portion 1a. Deodorization filter 7a and dust collection filter 7b are prevented from falling out of filter storage portion 1a by back panel 2. Back panel 2 has the shape of a generally rectangular plate, with air inlets 2a made of a plurality of small pores formed in a matrix, and a mesh-like fibrous sheet affixed to a rear face.

A humidification filter unit 3 and water tank 4 are disposed in front of dust collection filter 7b. Water tank 4 is placed on a bottom plate of housing 1, and can be drawn out from one side portion of housing 1 (right side in front view) together with humidification filter unit 3 supported by water tank 4.

Humidification filter unit 3 includes a disk-shaped water-absorbing filter 31 having water absorbability and air permeability and folded in a zigzag manner, and a retaining frame 30 in an annular shape for storing and retaining water-absorbing filter 31. Water-absorbing filter 31 is made by being stamped out of a filter material having an appropriate thickness. Retaining frame 30 is made of synthetic resin. A ring gear 32 with teeth formed in a central portion in a width direction along the entire circumference is provided on an outer circumferential surface of retaining frame 30.

Ring gear 32 of retaining frame 30 meshes with a drive gear 51 of a drive unit 5 provided above retaining frame 30. Drive unit 5 includes, in addition to drive gear 51, a transmission gear which meshes with drive gear 51 and a drive motor (not shown) having an output shaft coupled to the transmission gear, and is fixed at an appropriate position in housing 1.

Referring to FIG. 6, in a lower portion within water tank 4, two support rollers 6 in the shape of a drum having a shaft center along a width direction of water tank 4 are disposed in a distributed manner in a longitudinal direction of water tank 4. Each support roller 6 is rotatably supported by opposite sidewalls in the width direction of water tank 4.

Each support roller 6 rotationally contacts opposite side faces of ring gear 32 to thereby support retaining frame 30 of humidification filter unit 3 from below, and position retaining frame 30 in the width direction of water tank 4. Humidification filter unit 3 is supported in a vertically standing position, with its lower portion inserted in water tank 4.

Water tank 4 is a dish-shaped container having an opened top, and is positioned in front of dust collection filter 7b within filter storage portion 1a by being fitted in a guide portion 4g provided at the bottom plate of housing 1. Water tank 4 can be drawn out from one side face of housing 1 by sliding along guide portion 4g. Wide tank receiver 40 is connected to an end portion at the drawing side of water tank 4, and feed water tank 41 can be attached to/removed from tank receiver 40. A float switch 400 for detecting a water level in the tank receiver is provided on tank receiver 40. Float switch 400 includes a float plate 410 and a support shaft 420.

Referring to FIG. 4, feed water tank 41 is a container in the shape of a parallelepiped having a water plug 42 at an end portion on one side thereof, and is mounted on tank receiver 40 in an inverted position with the water plug 42 side facing downward. Water plug 42 includes a fixed water level valve. When feed water tank 41 is mounted on tank receiver 40, the fixed water level valve is opened by being lifted by a lifting projection 43 provided to stand on a bottom surface of tank receiver 40 (see FIG. 6), and has the function of delivering water contained in feed water tank 41 into water tank 4 to keep the level of water stored in water tank 4 constant.

Referring to FIG. 5, an air path cover 12 is attached to a front face side of dividing wall 11. Air path cover 12 has a lower cylindrical portion 12a, and a flat upper rectangular cylindrical portion 12b having a lower end connected to an outer circumferential portion of cylindrical portion 12a (but opening at the dividing wall 11 side, however).

An air blower 8 is disposed in front of humidification filter unit 3 with dividing wall 11 interposed therebetween, and a plurality of air holes 11a communicated with air blower 8 are formed in a lower portion of dividing wall 11. Air blower 8 includes a fan 81 and a fan motor 82 for driving and rotating fan 81. Although fan 81 is a turbo fan in this embodiment, other fans such as a propeller fan and a cross-flow fan may be employed. With the emphasis on the easiness of drive control, a DC motor is used as fan motor 82.

A blown air path 13 is formed in space located above air blower 8 and surrounded by dividing wall 11 and rectangular cylindrical portion 12b of air path cover 12. An upper surface of housing 1 is inclined such that a back side portion is lower than a front side portion, and upwardly opening air outlet 15 communicated with blown air path 13 is provided in this inclined back side portion.

Fan 81 rotates by being driven by fan motor 82 of air blower 8, to suction the outside air (air in the room) through air inlets 2a in back panel 2, and the suctioned air is purified such that it has no odor and dust when passing through deodorization filter 7a and dust collection filter 7b.

The purified air is humidified or not humidified by water-absorbing filter 31, and suctioned through air holes 11a in dividing wall 11 into a central portion of fan 81. The air suctioned into the central portion of fan 81 passes between fan blades and is discharged from the outer periphery of fan 81, guided upward while flowing through blown air path 13 and blown into the room from air outlet 15.

An air flow path 20 extending upward while being bent in a substantially L shape from air inlet 18 opening at the front face of housing 1 (see FIGS. 1 and 2) when viewed in transverse section, and reaching air outlet 17 provided in the upper portion of the front face of housing 1, is provided in front of rearwardly inclined rectangular cylindrical portion 12b of air path cover 12. Air flow path 20 is a space surrounded by a back wall 20a, a front wall 20b, and a sidewall 20c connecting opposite edge portions of back wall 20a and front wall 20b.

A cross-flow fan 21 having a horizontally disposed rotary shaft 21b attached to a fan 21c is provided at a location close to air outlet 17 in air flow path 20. Rotary shaft 21b is rotatably supported by sidewall 20c on opposite sides of air flow path 20. A fan motor 21a for driving cross-flow fan 21 is installed outside air flow path 20, with an output shaft of fan motor 21a disposed coaxially with rotary shaft 21b.

An ion generator 22 for generating positive and negative ions is provided at a wall surface between cross-flow fan 21 and air outlet 17 in air flow path 20. Ion generator 22 includes a needle-like discharge electrode (not shown) provided to be exposed at the air path, and a voltage having an AC waveform or impulse waveform is supplied from a power feeding unit (not shown) to the discharge electrode to cause the discharge electrode to generate ions.

When fan motor 21a of cross-flow fan 21 and ion generator 22 are driven, the ions generated by ion generator 22 are added to the air suctioned through air outlet 17 by cross-flow fan 21, and the air including the ions is blown forward from air outlet 17.

(Air Flow)

Referring now to FIG. 5, an air flow by air purifier 1000 having the above-described configuration is described. Air purifier 1000 is placed on a floor surface. The air suctioned from the rear face side of air purifier 1000 (arrow A1) passes through deodorization filter 7a and dust collection filter 7b and is purified. The purified air is humidified (or may not be humidified) by humidification filter unit 3.

The purified air blown upward in an obliquely rearward direction from air outlet 15 in the upper surface (arrow A2) circulates around the room through the walls, ceiling and the like, then returns to the front face side of air purifier 1000 and hits the front face side of air purifier 1000.

The air hitting the front face side of air purifier 1000 (arrow A3) is suctioned through air inlet 18 for ions. The air suctioned through air inlet 18 has the dust removed at dust-proof filter 300, receives the ions when flowing through air flow path 20, and is blown forward from air outlet 17 (arrow A4). The air blown forward from air outlet 17 also circulates and returns to the front face side of the air purifier.

Although only dust-proof filter 300 is disposed in air flow path 20 in the above-described embodiment, a deodorization filter and a dust collection filter similar to deodorization filter 7a and dust collection filter 7b may be disposed in order to increase the purification performance.

(Second Embodiment: Infrared Unit 200)

Figure 7:
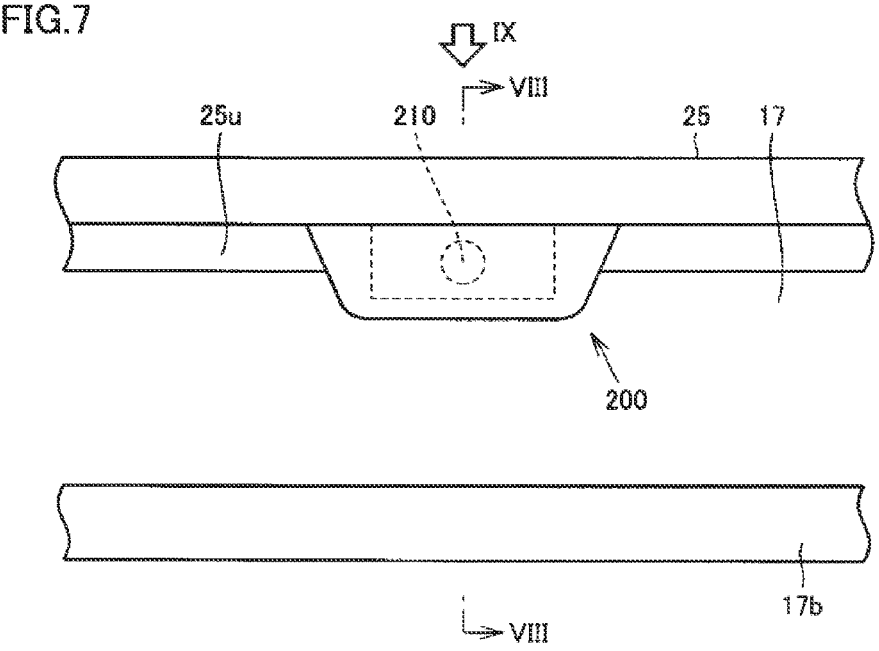
FIG. 7 is a diagram showing an infrared unit in a second embodiment, which is a partial enlarged view of a region enclosed by VII in FIG. 2.
Figure 8:
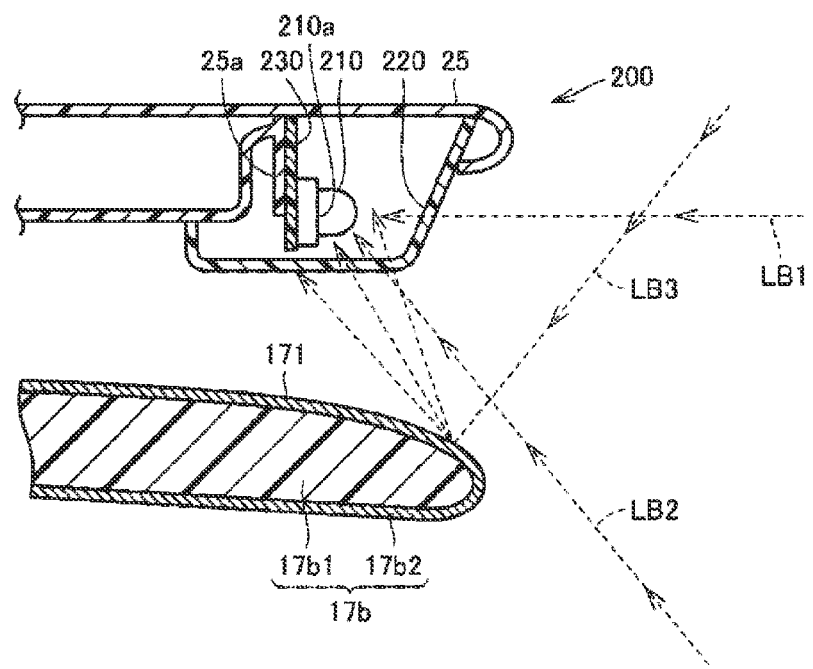
FIG. 8 is a sectional view taken along line VIII-VIII in a direction or arrows in FIG. 7.
Figure 9:
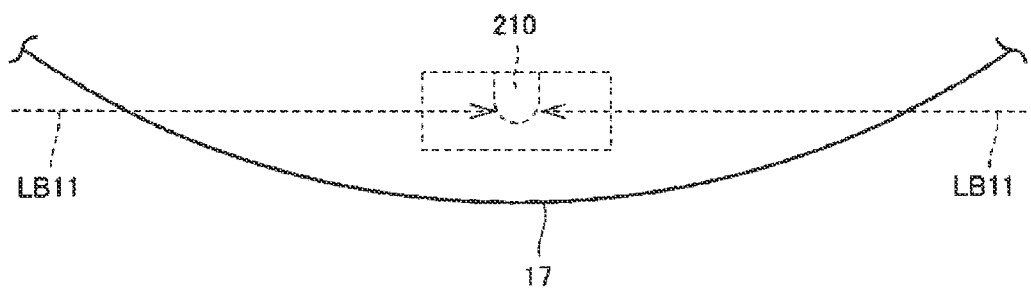
FIG. 9 is a schematic diagram on arrow IX in FIG. 7.

Referring now to FIGS. 7 to 9, infrared unit 200 in this embodiment is described. FIG. 7 is a partial enlarged view of a region enclosed by VII in FIG. 2, FIG. 8 is a sectional view taken along line VIII-VIII in a direction or arrows in FIG. 7, and FIG. 9 is a schematic diagram on arrow IX in FIG. 7.

Referring to FIGS. 7 and 8, air outlet 17 defined by a region surrounded by an upper wall 25u and a lower wall 25d (see FIG. 2) is provided at the front side of housing 1. Wind direction plate 17b extending in a substantially horizontal direction is provided between upper wall 25u and lower wall 25d.

Infrared unit 200 including an infrared light receiving element 210 capable of receiving infrared light is attached to a lower surface of upper wall 25u. Infrared unit 200 has infrared light receiving element 210 attached to a substrate 230, and substrate 230 is fixed to a vertically suspended wall 25a provided on top panel 25. With substrate 230 fixed to vertically suspended wall 25a, and infrared light receiving element 210 attached to substrate 230, a light receiving portion 210a of infrared light receiving element 210 faces forward.

Substrate 230 including infrared light receiving element 210 is covered with a dust-proof hood 220. Dust-proof hood 220 is made of a material that can transmit infrared light.

Wind direction plate 17b has a core member 17b1 provided between upper wall 25u and lower wall 25d and extending in a substantially horizontal direction. In this embodiment, core member 17b1 is covered with an infrared light highly scattering member 17b2.

As used herein, infrared light highly scattering member 17b2 means a material having a higher degree of scattered reflection of infrared light emitted from an external device and received by infrared unit 200 than a degree of scattered reflection on core member 17b1. As used herein, the scattered reflection means diffuse reflection, where light incident on the surface is scattered. Thus, that the degree of scattered reflection is high means that the degree of scattering of light incident on the surface is high.

In this embodiment, heat-resistant resin (ABS) is used for core member 17b1, and a film on which a nickel plating process (electroplating) has been performed is used for infrared light highly scattering member 17b2. The film has a thickness less than or equal to 5 microns.

As a result, as shown in FIG. 8, of the infrared light emitted from external devices, infrared light LB1 reaching through the front can be directly received by infrared light receiving element 210. Infrared light LB2 reaching from below can also be directly received by infrared light receiving element 210. Infrared light LB3 reaching from above is scatteredly reflected temporarily by infrared light highly scattering member 17b2, and then can be received by infrared light receiving element 210.

Although an emission angle of infrared light LB3 reaching from above is not constant, the infrared light is scatteredly reflected by infrared light highly scattering member 17b2, so that infrared light LB3 scatteredly reflected from infrared light highly scattering member 17b2 can be received by infrared light receiving element 210 regardless of the emission angle of infrared light LB3.

Infrared unit 200 in this embodiment can receive light emitted from various angles from above and below. Thereby, infrared unit 200 can receive not only a signal transmitted from a switch on a remote control of air purifier 1000, but also a signal transmitted from an air conditioner or a self-propelled cleaning robot, for example.

Conventionally, examples of a method for improving light reception sensitivity when receiving infrared light emitted from an external device using a light emitting element have included increasing the number of light emitting elements, and increasing the output of the light emitting element. Increasing the number of light emitting elements, however, has resulted in an increase in manufacturing cost of the infrared unit. Increasing the output of the light emitting element has resulted in the need to suppress the generation of noise and adjust the circuit due to an increase in electric power.

According to the air purifier in this embodiment, however, an air purifier with enhanced functionality having excellent light reception sensitivity can be provided without causing such problems.

In wind direction plate 17b of this embodiment, it is preferable that a side face of core member 17b1 facing infrared unit 200 have an inclined surface 171 extending downward from the back side toward the front side. Thereby, even if the emission angle of infrared light LB3 reaching from above is shallow, infrared light LB3 scatteredly reflected from infrared light highly scattering member 17b2 can be received by infrared light receiving element 210.

As shown in FIG. 9, in this embodiment, when air purifier 1000 is seen in plan view, air outlet 17 is provided to extend toward the back from the central region toward the opposite sides, and infrared unit 200 is provided in the central region of air outlet 17. With air outlet 17 shaped as in this embodiment, the opposite sides of infrared unit 200 are opened. As a result, infrared light emitted from a wider range of angles can be received by infrared light receiving element 210.

Although this embodiment illustrates a case where the nickel plating process is performed as infrared light highly scattering member 17b2 on the entire surface of core member 17b1 of wind direction plate 17b in FIG. 8, the nickel plating process may be performed only on the side facing infrared unit 200. The nickel plating process may be performed only on an area where the infrared light can be received by infrared unit 200 by being scatteredly reflected.

As infrared light highly scattering member 17b2, not only the nickel plating process but a plating process of covering the core member with a metal thin film such as chromium plating may be performed. That is, any material will do as long as the material has a higher degree of scattered reflection of infrared light emitted from an external device and received by infrared unit 200 than the degree of scattered reflection on core member 17b1. For example, a silver seal or the like may simply be affixed to core member 17b1. The surface of core member 17b1 may be treated and used as infrared light highly scattering member 17b2. Further, a chromium deposition process may be employed as a film forming method for infrared light highly scattering member 17b2.

Although this embodiment describes a configuration where infrared unit 200 is provided on the lower surface of upper wall 25u, as being below upper wall 25u, a configuration where infrared unit 200 is provided on an upper surface of lower wall 25d, as being below upper wall 25u, may also be employed.

In particular, if a signal from an air conditioner which is assumed to be emitted to infrared light receiving element 210 from above cannot be received due to the arrangement or the like, the signal from the air conditioner may be temporarily received by a self-propelled cleaning robot, which then moves closer to the front of air purifier 1000 in a self-propelled manner and transmits the signal to air purifier 1000.

In this case, the signal from the cleaning robot emitted to infrared light receiving element 210 from below can be scatteredly reflected by infrared light highly scattering member 17b2 of upper wall 25u, and received by infrared light receiving element 210.

Although this embodiment describes a case where the infrared light emitted from outside is received by infrared light receiving element 210, if infrared unit 200 includes an infrared light emitting element and infrared unit 200 emits infrared light, the infrared light emitted from infrared unit 200 of air purifier 1000 can likewise reach external devices disposed over a wide range.

(Third Embodiment: Dust-Proof Filter 300)

Figure 10:
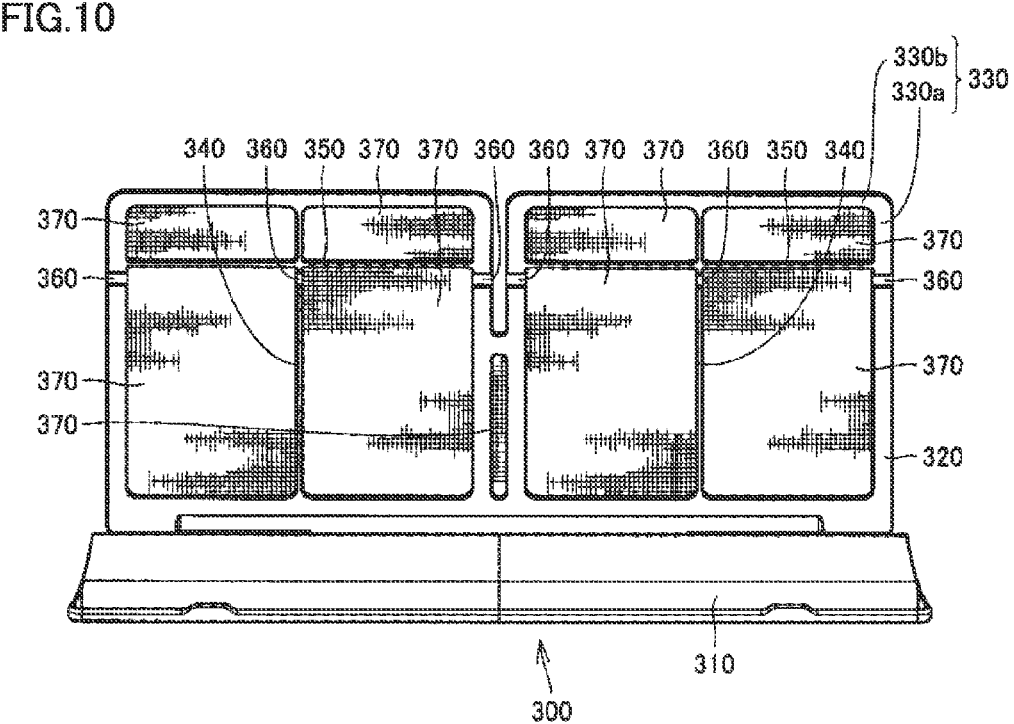
FIG. 10 is a front view of a dust-proof filter used in an air purifier in a third embodiment.
Figure 11:
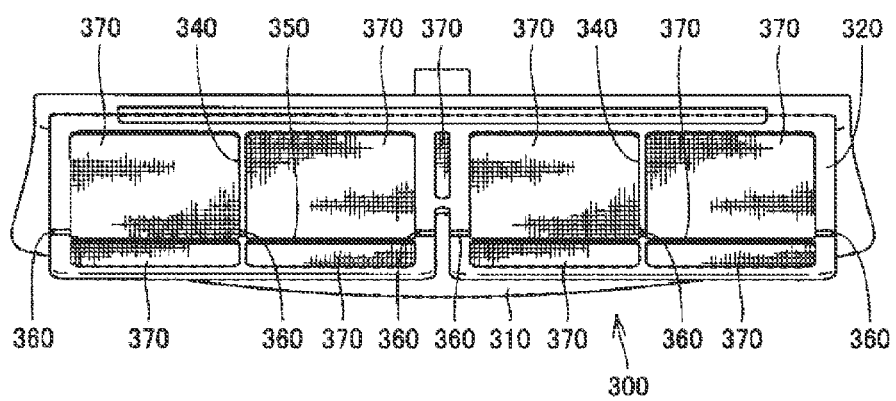
FIG. 11 is a plan view of the dust-proof filter used in the air purifier in the third embodiment.
Figure 12:
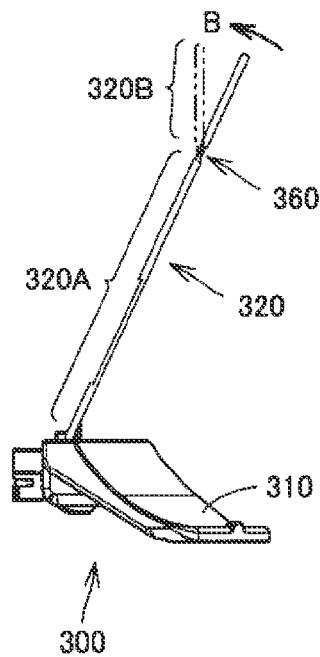
FIG. 12 is a side view of the dust-proof filter used in the air purifier in the third embodiment.

Referring now to FIGS. 10 to 12, dust-proof filter 300 in this embodiment is described. FIG. 10 is a front view of dust-proof filter 300, FIG. 11 is a plan view of dust-proof filter 300, and FIG. 12 is a side view of dust-proof filter 300.

Referring to FIGS. 10 and 11, dust-proof filter 300 includes a base portion 310, and a filter portion 320 provided to stand from base portion 310. Filter portion 320 includes a filter member 370, and an elastically deformable frame member 330 for surrounding and retaining filter member 370. Frame member 330 is made of an elastically deformable resin material.

Frame member 330 has a vertical frame member 330a standing from base portion 310, and a horizontal frame member 330b extending in a direction intersecting with vertical frame member 330a, and a brittle region 360 formed as a thinner region than the other regions is provided in vertical frame member 330a.

Further, in this embodiment, frame member 330 has a horizontal auxiliary frame member 350 extending parallel to horizontal frame member 330b so as to divide filter member 370 in a vertical direction. Further, this embodiment has a vertical auxiliary frame member 340 extending parallel to vertical frame member 330a so as to divide filter member 370 in a horizontal direction. Brittle region 360 is also provided in vertical auxiliary frame member 340.

It is preferable that brittle region 360 be provided in a region of vertical frame member 330a close to the base portion 310 side (lower side) in the vicinity of intersecting horizontal auxiliary frame member 350. Likewise, it is preferable that brittle region 360 be provided in a region of vertical auxiliary frame member 340 close to the base portion 310 side (lower side) in the vicinity of intersecting horizontal auxiliary frame member 350.

As shown in FIG. 12, dust-proof filter 300 having the above-described configuration can be divided along brittle region 360 in filter portion 320 into a lower filter region 320A located close to base portion 310 and an upper filter region 320B located close to the tip.

Before being inserted in air purifier 1000, lower filter region 320A and upper filter region 320B extend in a straight line. Thus, the position of the tip of dust-proof filter 300 can be readily confirmed, so that dust-proof filter 300 can be readily inserted in air inlet 18 of air purifier 1000.

After the insertion, dust-proof filter 300 proceeds along a guide 320G provided in air purifier 1000 (see FIG. 5), with a tip portion of guide 320G standing toward fan 21c without being inclined. This is to secure an effective filter area in the limited space, to reduce pressure loss due to the filter.

With brittle region 360 provided in dust-proof filter 300 in this embodiment, filter portion 320 of dust-proof filter 300 can be readily bent even if guide 320G includes a bent portion.

Without brittle region 360, if an external force in a bending direction is applied to frame member 330 of dust-proof filter 300, stress is generated in frame member 330 which may damage frame member 330.

However, in this embodiment, with brittle region 360 positively provided in frame member 330, even if an external force in a bending direction is applied to frame member 330 of dust-proof filter 300, brittle region 360 can be bent to avoid the generation of stress to frame member 330. As a result, the possibility of damaging frame member 330 can be avoided.

In this embodiment, brittle region 360 is provided in the region of vertical frame member 330a close to the base portion 310 side (lower side) in the vicinity of intersecting horizontal auxiliary frame member 350. Consequently, a region with increased strength owing to vertical frame member 330a and brittle region 360 are adjacent to each other, thereby further facilitating the bending at brittle region 360.

(Fourth Embodiment: Speaker Assembly 500)

Figure 13:
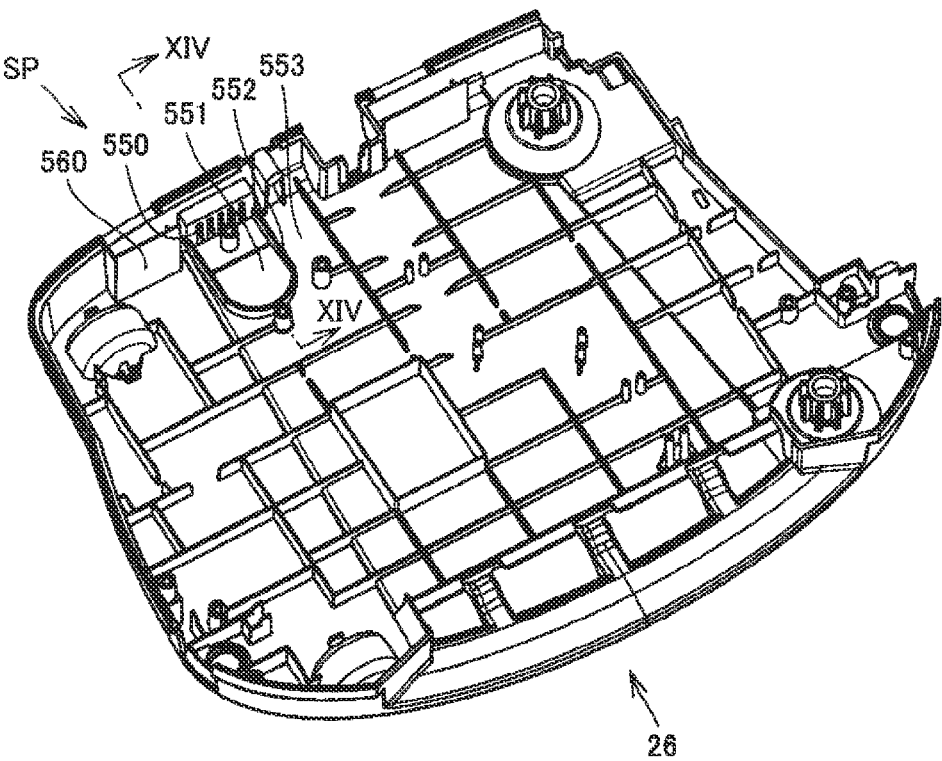
FIG. 13 is a perspective view of a bottom panel used in an air purifier in a fourth embodiment.
Figure 14:
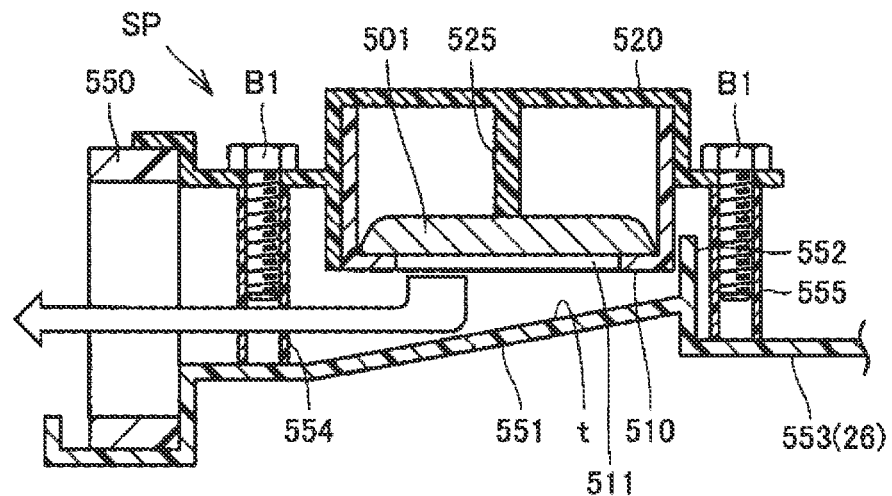
FIG. 14 is a sectional view taken along line XIV-XIV in FIG. 13, which is a sectional view of a region enclosed by XIV in FIG. 5.
Figure 15:
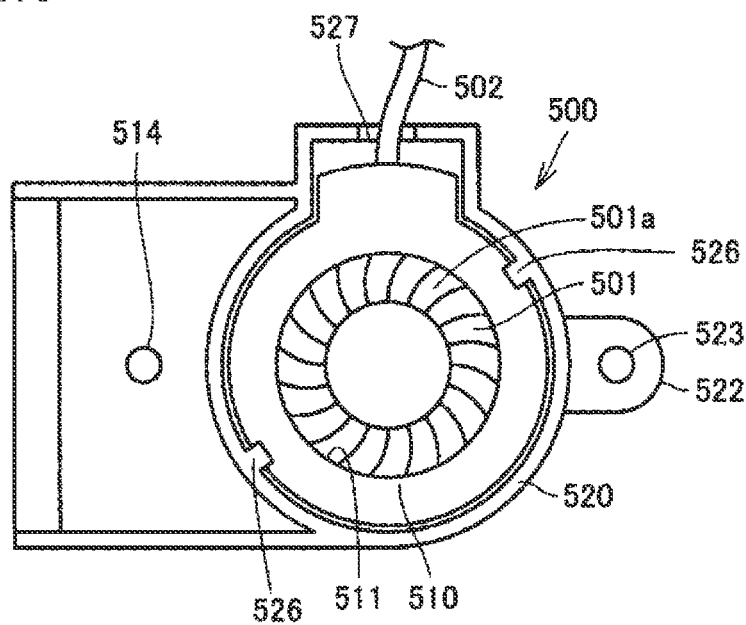
FIG. 15 is a bottom view of a speaker assembly in the fourth embodiment.

Referring now to FIGS. 13 to 15, speaker assembly 500 in this embodiment is described. FIG. 13 is a perspective view of a bottom panel 26 used in air purifier 1000, FIG. 14 is a sectional view taken along line XIV-XIV in FIG. 13, and FIG. 15 is a bottom view of speaker assembly 500.

Referring to FIG. 13, bottom panel 26 used in air purifier 1000 has a bottom plate 553 located at a bottom surface of housing 1, and a back wall 560 standing from bottom plate 553 at the back side of housing 1. Audio opening 550 is provided in back wall 560 (see FIG. 3).

A speaker attachment region SP where speaker assembly 500 including a speaker 501 (described later) is fixed is provided in audio opening 550. An inclined bottom 551, a waterproof wall 552, and nut posts 554, 555 are provided in speaker attachment region SP.

Referring to FIGS. 14 and 15, a structure of speaker attachment region SP is described together with speaker assembly 500. Speaker 501 has a disk-shaped oscillation portion 501a. Speaker assembly 500 has a first retaining member 510 and a second retaining member 520.

First retaining member 510 has a cylindrical shape with a bottom, retains speaker 501 at the bottom, and has a hole 511 in the bottom for opening oscillation portion 501a. Second retaining member 520 also has a cylindrical shape with a bottom, accommodates first retaining member 510 from its open side, and has a support strut 525 extending from the bottom toward the open side and supporting speaker 501 from the rear face side of speaker 501.

Locking pawls 526, 526 are provided at the open end side of the tubular portion of second retaining member 520. By accommodating speaker 501 in first retaining member 510, and further accommodating first retaining member 510 in second retaining member 520, locking pawls 526, 526 engage the bottom of first retaining member 510 to maintain a coupled state between first retaining member 510 and second retaining member 520.

At a rear face of speaker 501, a central portion of speaker 501 is pressed by support strut 525 of second retaining member 520 to fix speaker 501, thus completing speaker assembly 500. A cable provided in speaker 501 is drawn from a notch portion 527 provided in second retaining member 520.

Second retaining member 520 has a bolt hole 523 provided in a speaker retaining flange 522, and a bolt hole 514 provided in the main body of second retaining member 520. Speaker assembly 500 is fixed to speaker attachment region SP by aligning bolt holes 523, 514 with nut posts 554, 555 provided on bottom plate 553, and using a bolt B1.

As shown in FIG. 14, speaker assembly 500 is fixed to bottom panel 26 such that oscillation portion 501a of speaker 501 faces bottom plate 553 at a prescribed distance from bottom plate 553.

Further, bottom plate 553 facing speaker 501 has inclined bottom 551 having a distance from oscillation portion 501a of speaker 501 which increases toward back wall 560 provided with audio opening 550. This can provide voice emitted from oscillation portion 501a with a sound reverberation effect by reflection from inclined bottom 551, and can direct the voice to audio opening 550.

Although audio opening 550 may be provided in bottom panel 26, this may result in voice attenuation since the voice will be emitted toward the floor surface. This may also cause easy entry of foreign materials (water, dust, etc.) from the floor surface. In this embodiment, the entry of foreign materials is suppressed by providing audio opening 550 in the back close to the side face. Moreover, the air purifier of this embodiment is often disposed relatively close to a wall. In this case, voice emitted from the back close to the side face is reflected from the wall and readily reaches a user positioned in front of the air purifier.

In this embodiment, waterproof wall 552 is provided to surround speaker assembly 500 in speaker attachment region SP. With water tank 4 located close to speaker assembly 500, waterproof wall 552 prevents speaker assembly 500 from being submerged in water in case the water overflows water tank 4, and prevents the water from leaking outside from audio opening 550.

(Fifth Embodiment: Control of Air Purifier 1000)

Figure 16:
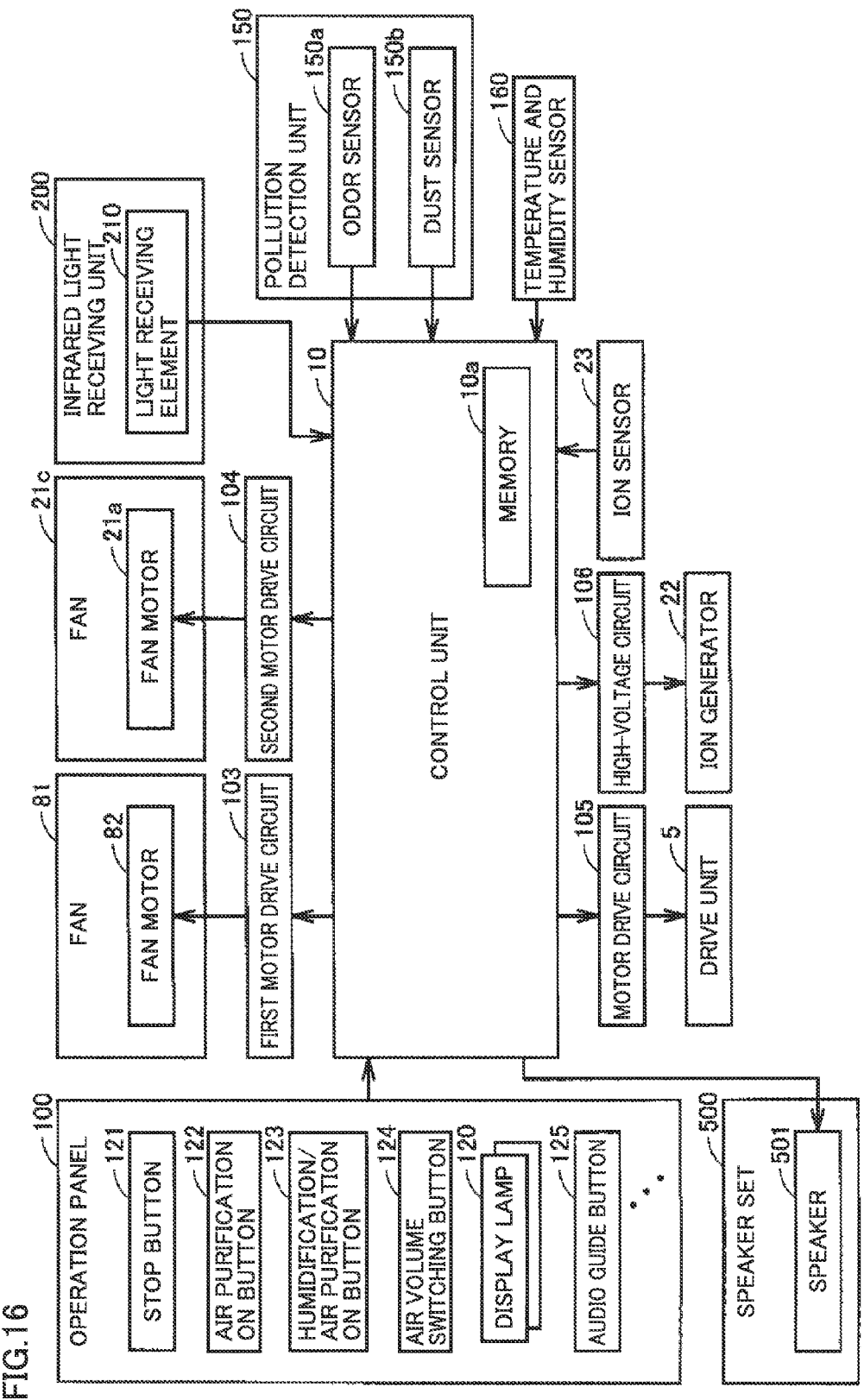
FIG. 16 is a block diagram showing a schematic configuration of a control system of an air purifier in a fifth embodiment.

Referring now to FIG. 16, a control system of air purifier 1000 in this embodiment is described. FIG. 16 is a block diagram showing a schematic configuration of the control system of air purifier 1000 in this embodiment. The control system of air purifier 1000 includes operation panel 100 operated by the user, a control unit 10 for accepting an operation signal from operation panel 100 and controlling the operation of fan motor 82, fan motor 21a and the like, and a sensor such as pollution detection unit 150 described above for inputting various physical amounts to control unit 10.

Control unit 10 has a ROM for storing information such as a program, a CPU for performing input/output control and arithmetic operation in accordance with the control program stored in the ROM in advance, a RAM for storing temporarily generated information, a nonvolatile writable/readable memory 10a, and an input/output interface for input/output to/from an external circuit. Pollution detection unit 150, a temperature and humidity sensor 160, and an ion sensor 23 are connected to one another via the input/output interface, and control unit 10 receives detection values from these sensors.

Control unit 10 also receives, via the input/output interface, an operation control signal input from infrared light receiving element 210 provided in infrared unit 200.

Control unit 10 is connected to a stop button 121, an air purification ON button 122, a humidification/air purification ON button 123, an air volume switching button 124, and an audio guide button 125 of operation panel 100. The operation on operation panel 100 is accepted by control unit 10. Specifically, by operating stop button 121, a stop of operation of air purifier 1000 is accepted by control unit 10. By operating air purification ON button 122, the selection of an air purification operation mode in which the air is purified without being humidified is accepted by control unit 10. By operating humidification/air purification ON button 123, the selection of a humidification/air purification operation mode in which the air is purified while being humidified is accepted by control unit 10.

Whenever air volume switching button 24 is operated, the air volume mode is switched between four air volume modes including "quiet," "medium" and "high" for which the air volume is set manually and "automatic" for which the air volume is set automatically. Such switching is accepted by control unit 10 in this order, for example.

By operating audio guide button 125, information on the operation of air purifier 1000 is announced by voice through speaker 501 provided in air purifier 1000.

Control unit 10 is connected to fan motor 82 of fan 81, fan motor 21a of fan 21c, drive unit 5 of humidification filter unit 3, and ion generator 22, through a first motor drive circuit 103, a second motor drive circuit 104, a motor drive circuit 105, and a high-voltage circuit 106, respectively.

Control unit 10 outputs an instruction signal to each of the drive circuits and the high-voltage circuit described above based on an operation signal accepted by operation panel 100 and the detection value from each of the sensors described above, to control fan motor 82, fan motor 21a, drive unit 5, and ion generator 22.

Further, control unit 10 controls fan motor 82, fan motor 21a, drive unit 5, and ion generator 22 based on an external operation control signal received from infrared light receiving element 210. Examples of the external operation control signal include an operation control signal transmitted from a switch on a remote control of air purifier 1000, an operation control signal transmitted from an air conditioner, and an operation control signal transmitted from a cleaning robot self-propelled on a floor surface.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 housing; 1a filter storage portion; 2 back panel; 2a air inlet; 3 humidification filter unit; 4 water tank; 4g guide portion; 5 drive unit; 6 support roller; 7a deodorization filter; 7b dust collection filter; 8 air blower; 9 wheel; 11 dividing wall; 11a air hole; 12 air path cover; 12a cylindrical portion; 12b rectangular cylindrical portion; 13 blown air path; 15 air outlet; 17 air outlet; 17a vertically positioned wind direction plate; 17b horizontal wind direction plate; 18 air inlet; 19 dust-proof filter; 20 air flow path; 20a back wall; 20b front wall; 20c sidewall; 21 cross-flow fan; 21a fan motor; 21b rotary shaft; 21c fan; 22 ion generator; 23 ion sensor; 24 front panel; 25 top panel; 25a vertically suspended wall; 25u upper wall; 25d lower wall; 26 bottom panel; 30 retaining frame; 31 water-absorbing filter; 32 ring gear; 40 tank receiver; 41 feed water tank; 42 water plug; 51 drive gear; 81 fan; 82 fan motor; 100 operation panel; 121 stop button; 122 air purification ON button; 123 humidification/air purification ON button; 124 air volume switching button; 125 audio guide button; 150 pollution detection unit; 171 inclined surface; 200 infrared unit; 210 infrared light receiving element; 220 dust-proof hood; 230 substrate; 300 dust-proof filter; 310 base; 320 filter portion; 320A lower filter region; 320B upper filter region; 320G guide; 330 frame member; 330a vertical frame member; 330b horizontal frame member; 340 vertical auxiliary frame member; 350 horizontal auxiliary frame member; 360 brittle region; 370 filter member; 400 float switch; 410 float plate; 420 support shaft; 500 speaker assembly; 501 speaker; 501a oscillation portion; 502 cable; 510 first retaining member; 511 hole; 520 second retaining member; 521 hole for speaker; 522 speaker retaining flange; 523, 514 bolt hole; 525 support strut; 526 locking pawl; 527 notch portion; 550 audio opening; 551 inclined bottom; 552 waterproof wall; 553 bottom plate; 554, 555 nut post; 560 back wall; 1000 air purifier.

The invention claimed is:

1. An air purifier having an air outlet defined by a region surrounded by an upper wall and a lower wall at a front side of a housing, comprising:
   a wind direction plate provided between the upper wall and the lower wall and extending in a substantially horizontal direction; and
   an infrared unit provided below the upper wall and including an infrared element capable of receiving and/or transmitting infrared light,
   the wind direction plate including
      a core member provided between the upper wall and the lower wall and extending in a substantially horizontal direction, and
      an infrared light highly scattering member provided on a side of the core member facing the infrared unit, the infrared light highly scattering member having a higher degree of scattered reflection of infrared light received by the infrared unit and/or infrared light transmitted from the infrared unit than a degree of scattered reflection on the core member.

2. The air purifier according to claim 1, wherein a side surface of the core member facing the infrared unit has an inclined surface extending downward from a back side toward a front side.

3. The air purifier according to claim 1, wherein the infrared light highly scattering member is a film obtained by performing a plating process on the core member.

4. The air purifier according to claims 1, wherein when the air purifier is seen in plan view, the air outlet is provided to extend toward the back from a central region toward opposite sides, and
the infrared unit is provided in the central region of the air outlet.

5. The air purifier according to claim 1, wherein the infrared element is disposed such that a light receiving portion thereof faces forward.

* * * * *